Nov. 13, 1928.
G. BODEN ET AL
HINGED PIN FASTENER
Filed March 8, 1928
1,691,880
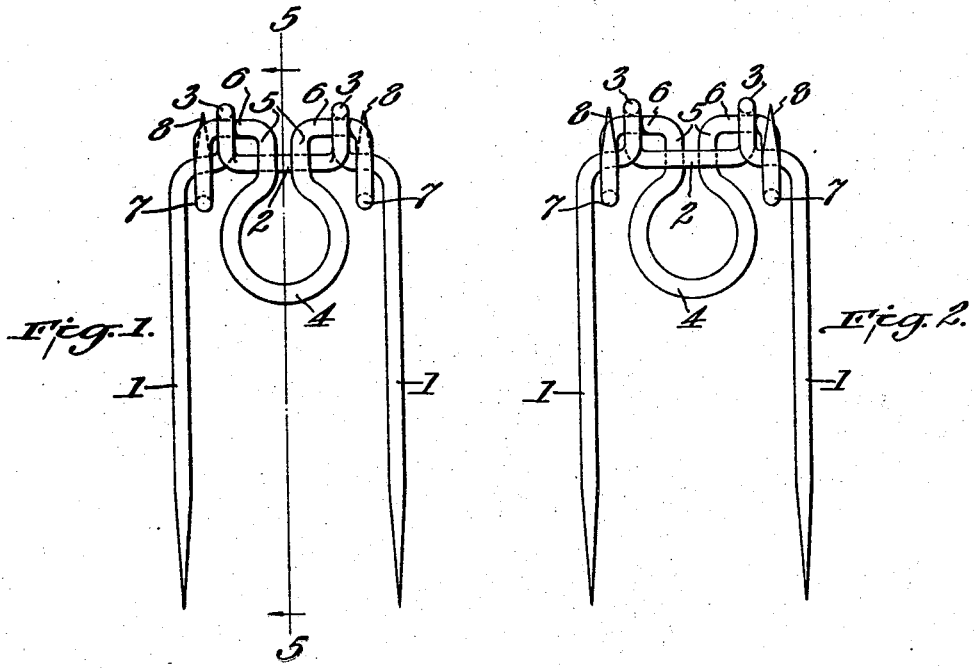
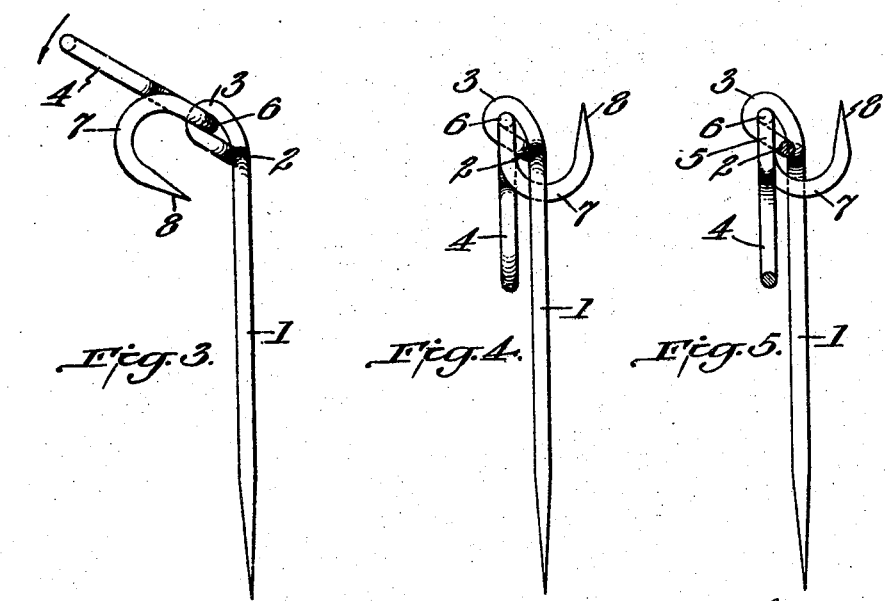
Inventors:
George Boden
George A. King
by Wm N. Finckel
Attorney.

Patented Nov. 13, 1928.

1,691,880

UNITED STATES PATENT OFFICE.

GEORGE BODEN AND GEORGE A. KING, OF WATERBURY, CONNECTICUT, ASSIGNORS TO SCOVILL MANUFACTURING COMPANY, OF WATERBURY, CONNECTICUT, A CORPORATION OF CONNECTICUT.

HINGED PIN FASTENER.

Application filed March 8, 1928. Serial No. 260,104

The object of this invention is to provide a pin-mounted snap fastener which when in position of use locks itself in place.

The invention consists of an all-wire structure, in which there is a double-pointed pin, the head of which is provided with eyes which form knuckles in which is hingedly mounted the pintle members of a socket member of a snap fastener, the pivotal ends of the socket member being extended rearwardly as pointed prongs beneath the head of the pin and projecting upwardly when the pin is in use, so that while the hinged member is lifted, the pin may be stuck in an article on which it is to be used, and then the hinged member turned down toward the pin limbs, and its pointed prongs thereby driven into the article to lock the device in set position, as we will proceed now to explain and finally claim.

In the accompanying drawings illustrating the invention, in the several figures of which like parts are similarly designated, Figure 1 is a front elevation illustrating one embodiment of our invention; Fig. 2 is a rear elevation; Fig. 3 is a side elevation with the socket member lifted; Fig. 4 is a side elevation showing the device as when set, and Fig. 5 is a vertical section taken on the line 5—5 of Fig. 1.

The pin has the pointed limbs 1, connected at the top by an integral cross piece 2, which is bent to form offstanding parallel eyes 3, which, as will presently appear, constitute the knuckles of a hinge for the socket member.

The socket member comprises a substantially circular loop 4, functioning as a resilient socket member of a snap fastener and adapted to engage a complemental rigid stud member. The terminals 5 of the loop are brought into parallel position, and then extended laterally, in opposite directions, to form the pintle members 6 of the hinge joint, said pintle members extending through and hingedly mounted in the eyes 3 of the pin head. The members 6 beyond the eyes are reverted, that is to say, curved downwardly and rearwardly, as at 7, so as to extend beneath the head of the pin, and their ends 8 are pointed to form prongs which, when the pin is in set position, as in Figs. 1, 2, 4 and 5, extend upwardly so as to engage the article on which they are used.

As will be understood, the socket member is freely movable on the pin head, and there is sufficient clearance between the eyes and the socket member parts to permit expansion and contraction of the socket member in engaging and disengaging the stud.

The eyes on the pin head are inclined forwardly so as to bring the socket member, when in normal position of use, into substantial parallelism with the limbs of the pin, as shown in Figs. 4 and 5 particularly.

Both the pin portion and the socket portion are made of wire, bent to shape.

The invention is especially applicable to attaching covers to the upholstery of automobiles, and in this case the covers will be supplied with the complemental stud members of snap fasteners, and the pins will be stuck in the upholstery, points down. In sticking the pins in the upholstery the snap fastener element is turned upwardly, as indicated in Fig. 3, so that the prongs 8 will not obstruct the descent of the pin up to its head into the upholstery, and then the snap fastener element is rotated on the head of the pin in the direction of the arrow, Fig. 3, so as to thrust the prongs of the element into the upholstery and thus lock the pin in set position on the upholstery.

By the provision of a hinged element, it is possible to stick the pins in place vertically at right angles to the article upon which the pins are adapted, thus ensuring facility of application. The snap fastener element will then lie upon the outside of the article in convenient position to be engaged by its complemental member on the element to be secured, such as a seat cover.

The patent of John H. Goss, owned by the owners of this present invention, and numbered 1,649,768, dated November 15, 1927, shows an all-wire pin-mounted snap fastener. This present invention is in the nature of an improvement on the Goss invention.

Variations in details of construction are permissible within the principle of the invention and the claims following.

What we claim is:—

1. A snap fastener element, comprising a resilient socket member provided with the pintle members of a hinge, and a double-pointed pin having a head provided with eyes serving as knuckles in which the socket member by means of its pintle members is hingedly mounted.

2. A snap fastener element, comprising a resilient socket member provided with laterally extended terminals functioning as pintles, and a double-pointed pin having a head provided with eyes functioning as knuckles in which the socket member by means of its pintles is hingedly mounted, the socket member and the pin being made of wire.

3. A snap fastener element, comprising a resilient socket member having laterally extending pintles, and a double-pointed pin having a head provided with eyes functioning as knuckles in which the socket member is hingedly mounted by its pintles, the knuckles being inclined forwardly so as to permit the socket to hang in parallelism with the limbs of the pin.

4. A snap fastener element, comprising a resilient socket member, and a double-pointed pin having a head provided with knuckles in which the socket member is hingedly mounted, the terminals of the socket member being made as prongs and extending, when in use, below the head of the pin and to the rear thereof so as to lock the device in position when in use.

5. A hinged pin fastener, comprising a double-pointed pin having a head provided with eyes which serve as hinge knuckles, and a resilient socket member having a loop to engage a complemental stud member, the terminals of the loop brought into parallelism and then extending through the eyes on the pin head with sufficient clearance therein to permit the expansion and contraction of the loop in cooperaitng with the said stud member, and ending in reverted prongs.

In testimony whereof we have hereunto set our hands this 7th day of March A. D. 1928.

GEORGE BODEN.
GEORGE A. KING.